United States Patent [19]
Lo et al.

[11] Patent Number: 6,115,760
[45] Date of Patent: Sep. 5, 2000

[54] INTELLIGENT SCALEABLE FIFO BUFFER CIRCUIT FOR INTERFACING BETWEEN DIGITAL DOMAINS

[75] Inventors: Burton B. Lo, San Francisco; Anthony L. Pan, Fremont, both of Calif.

[73] Assignee: 3Com Corporation, Santa Clara, Calif.

[21] Appl. No.: 09/138,943

[22] Filed: Aug. 24, 1998

[51] Int. Cl.[7] .............................. G06F 5/06; G06F 5/01; G06F 12/00
[52] U.S. Cl. .............................. 710/52; 710/52; 710/55; 710/56; 710/57; 364/238.6; 364/238.7; 364/238.8; 364/239.7
[58] Field of Search .............................. 710/52, 53–57; 364/238.6, 238.7, 238.8, 238.9, 239.7, 239.8; 365/189.05, 240; 711/4, 109, 110

[56] References Cited

U.S. PATENT DOCUMENTS

| | | | |
|---|---|---|---|
| 3,990,050 | 11/1976 | Kolettis et al. | 340/172.5 |
| 5,021,684 | 6/1991 | Ahuja et al. | 307/443 |
| 5,144,525 | 9/1992 | Saxe et al. | 365/45 |
| 5,256,916 | 10/1993 | Thurston | 307/451 |
| 5,345,554 | 9/1994 | Lippincott et al. | 395/162 |
| 5,835,498 | 11/1998 | Kim et al. | 370/537 |

*Primary Examiner*—Ario Etienne
*Attorney, Agent, or Firm*—Wagner Murabito & Hao LLP

[57] ABSTRACT

The circuit provides a scaleable buffer coupled between digital domains that require data buffering because they operate at different data transfer rates and/or because one or more of the digital domains uses data bursting. The scaleable buffer circuit does not have a large fixed throughput latency as is characteristic of a first-in-first-out buffer. The buffer includes serially coupled burst cells each having a sequential element, a controlled multiplexer and control logic for controlling the multiplexer and for generating output control signals. In one embodiment, the control circuit is a finite state machine. Each burst cell is capable of receiving data from an upstream burst cell or from the input data bus. Therefore, the buffer can be filled starting from its most downstream and vacant burst cell rather than always starting from the most upstream cell (as in a typical FIFO). This reduces the throughput latency of the buffer in cases when it is not always full. By using burst cells, rather than a dual ported RAM, the interface circuitry is significantly reduced in complexity. Each burst cell is uniform in construction and contains distributed interface circuitry making the circuit readily scaleable in size without redesigning the interface circuitry.

21 Claims, 10 Drawing Sheets

| | 350a | 310(j+1) | | 320(j-1) | 350b | 350c | 280j | 270 |
|---|---|---|---|---|---|---|---|---|
| | | | | CURRENT STATE 440 | | | NEW STATE 445 | |
| | FLUSH | UPSTREAM_VALID | MY_VALID | DOWNSTREAM_VALID | WRITE_DATA | READ_DATA | NEW_MY_VALID | MUXCNTRL |
| 412 | 1 | X | X | X | X | X | 0 | X |
| 414 | 0 | 0 | 0 | 0 | X | X | 0 | X |
| 416 | 0 | 0 | 0 | 1 | 0 | 0 | 0 | HOLD |
| 418 | 0 | 0 | 0 | 1 | 0 | 1 | 0 | X |
| 420 | 0 | 0 | 0 | 1 | 1 | 0 | 1 | LOAD |
| 422 | 0 | 0 | 0 | 1 | 1 | 1 | 0 | X |
| 424 | 0 | 0 | 1 | 1 | 0 | 0 | 1 | HOLD |
| 426 | 0 | 0 | 1 | 1 | 0 | 1 | 0 | X |
| 428 | 0 | 0 | 1 | 1 | 1 | 0 | 1 | HOLD |
| 430 | 0 | 0 | 1 | 1 | 1 | 1 | 1 | LOAD |
| 432 | 0 | 1 | 1 | 1 | 0 | 0 | 1 | HOLD |
| 434 | 0 | 1 | 1 | 1 | 0 | 1 | 1 | SHIFT |
| 436 | 0 | 1 | 1 | 1 | 1 | 0 | 1 | HOLD |
| 438 | 0 | 1 | 1 | 1 | 1 | 1 | 1 | SHIFT |

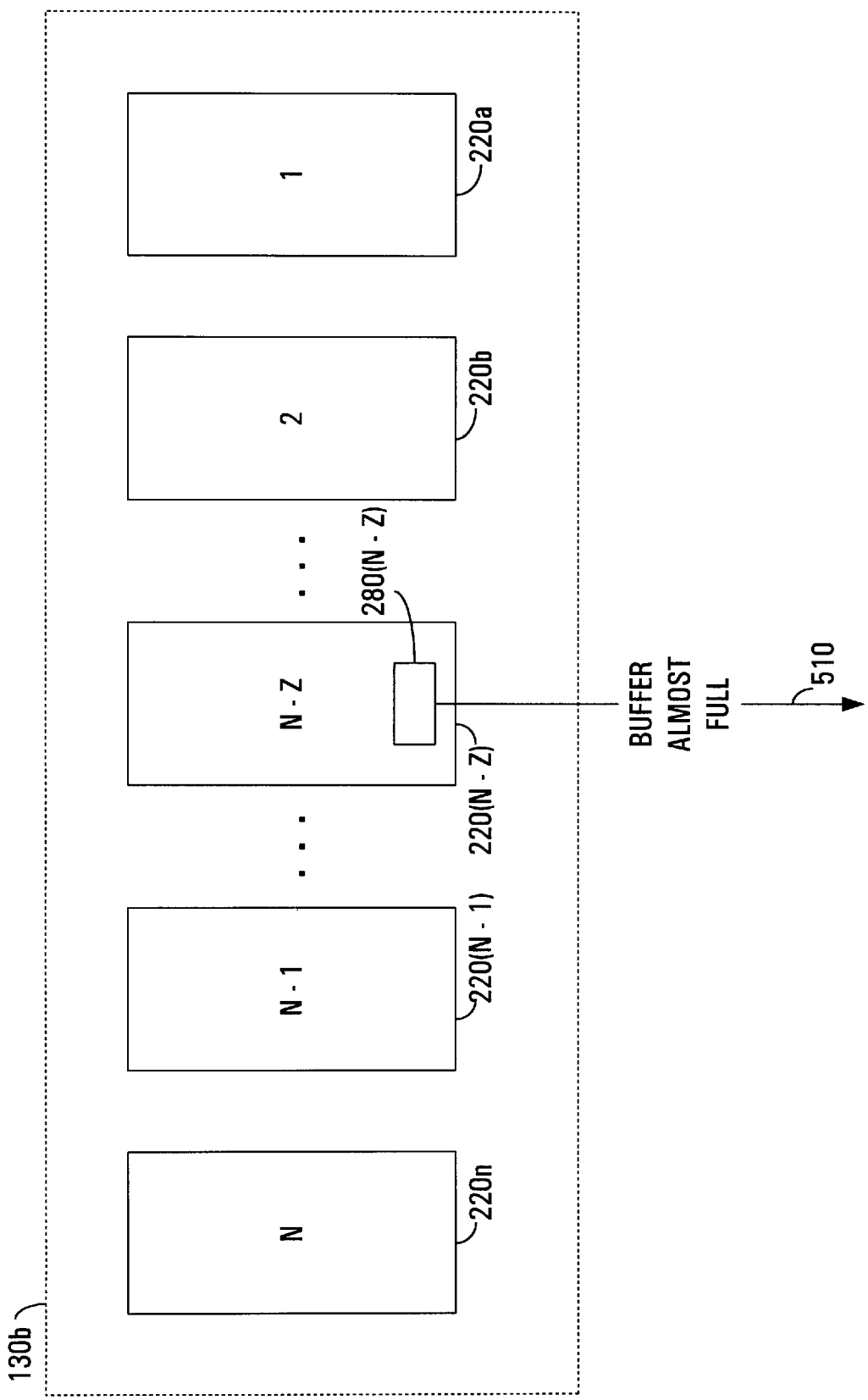

INTELLIGENT SCALEABLE FIFO BUFFER CIRCUIT FOR INTERFACING BETWEEN DIGITAL DOMAINS

BACKGROUND OF THE INVENTION

1. Field of the Invention

The present invention relates to the field of digital electronic systems. More particularly, the present invention relates to the field of buffer circuits used for the communication of information between two or more digital domains.

2. Related Art

Digital computer systems today often are interfaced together with multiple different and or separate domains. Networked computer systems often employ adapters, routers and switches that require data queuing for various reasons. The different or separate digital domains can have address/data/control buses that operate according to different communication protocols and/or operate at different data transfer rates. For instance, a computer system can have one digital domain operating in accordance with the PCI (Peripheral Component Interconnect) bus protocol and another digital domain operating in accordance with the ISA (Industry Standard Architecture) bus protocol. When interfacing digital domains having different bus protocols and/or having different data transfer rates, it is common to employ a buffer circuit located physically in between the digital domains to facilitate information communication between the two domains. The buffer acts to queue data in order to prevent any data loss due to the different data transfer rates and/or communication protocols.

Further, even between digital domains of the same data transfer rate and/or of the same communication protocol, it is common to employ buffer circuits between the domains to facilitate bursting operations between one or more of the domains. In this capacity, the buffer circuit also acts as a data queue. Data bursting is often done for improving the communication rate between domains and/or for handling prefetching operations, etc. For instance, a PCI target device which pipes data from the PCI bus to a memory unit (e.g., a random access memory, RAM) requires a data queue because the PCI bus can burst data in consecutive cycles while the RAM might take two cycles, or more, to complete one transaction. In these cases, the buffer circuit acts as a temporary holding place for the bursted data until the other domain can accept, e.g., read, the data.

In the past, first-in-first-out (FIFO) buffer circuits of the design 10, as shown in FIG. 1A, have been used to provide the data queuing functionality as described above. Prior art FIFO buffer circuit 10 includes i number of multi-bit register stages 12a–12i which are clocked by common clock 20. Only one bit of each register stage is shown in FIG. 1A for clarity. Data is received from a first domain/device at port 14 and stored in cell 12i (e.g., the upstream most cell) and is output to a second domain/device at port 16. As each new data is received at 12i, the existing data of FIFO buffer 10 is shifted by one register to the right, e.g., toward the output port 16. The problem with prior art FIFO buffer circuit 10 is that each new data must be received by the upstream most register 12i at port 14 and must traverse through all i stages until it is allowed to exit at port 16 (e.g., first-in-first-out). This is true even if FIFO buffer 10 is completely empty when the first of the new data is received. Therefore, there exists an i cycle latency (minimum) for each data received by the prior art FIFO buffer 10 regardless of its prior or current state of vacancy. Moreover, with respect to scaleability, the more register stages that are added to FIFO buffer circuit 10, the larger its minimum latency becomes. Therefore, it would be advantageous to provide a buffer design that does not have such a large latency as is characteristic of the FIFO buffer circuit 10. It would be advantageous further to provide a buffer design having a latency that does not necessarily increase with an increase in its storage capacity.

A second prior art buffer design 30 is shown in FIG. 1B that utilizes a dual ported random access memory (RAM) unit 42 as the data queue device. In buffer design 30, the first domain communicates over bus 32 with a first interface circuit 40a which is coupled to dual port RAM 42. Dual ported RAM 42 is coupled to interface 40b which communicates to the second domain over bus 36. Buffer design 30 does not have latency problems to the extent of buffer design 10 (FIG. 1A). However, the problem with buffer design 30 is that it is very complex to design and implement. For instance, the interface circuits 40a–40b require complex controller circuits, complex finite state machine designs, and complex counter and pointer logic to implement. Moreover, once designed, the interface circuits 40a–40b are generally specific to the size of the memory 42 and are not readily scaleable in size. For instance, if the memory 42 needs to be increased or decreased, then the interface circuits 40a–40b need to be redesigned. Therefore, it would be advantageous to provide a buffer design that does not require complex interface circuitry. It would also be advantageous to provide a buffer design whose interface circuitry is readily adaptable to changes in the capacity of the buffer.

Accordingly, the present invention provides a buffer design that does not have such a large latency as is characteristic of the FIFO buffer 10. The present invention further provides a buffer design having a latency that does not necessarily increase with an increase in storage capacity of the buffer. Moreover, the present invention provides a buffer design that does not require complex interface circuitry. The present invention also provides a buffer design whose interface circuitry is readily adaptable to changes in the capacity of the buffer. These and other advantages of the present invention not specifically mentioned above will become clear within discussions of the present invention presented herein.

SUMMARY OF THE INVENTION

An intelligent scaleable FIFO buffer circuit is described herein for interfacing between two or more digital domains, e.g., within a computer system and/or a communication network. Within the present invention, the digital domains require data buffering because they can operate at different data transfer rates and/or because one or more of the digital domains uses data bursting (e.g., for rapid data transfer, to accommodate multiple prefetch cycles, etc.). Synchronization circuitry can also be added to allow operation with multiple clock domain designs.

The present invention provides a scaleable buffer circuit coupled between the digital domains that does not require the complex data/control interfacing circuitry required of prior art memory buffers (e.g., dual port random access memories, RAMs). The scaleable buffer circuit further does not have a large fixed throughput latency as is characteristic of a first-in-first-out buffer of the prior art. The intelligent scaleable buffer of the present invention includes serially coupled burst cells each having a sequential element (e.g., a flip-flop sequential cell), a controlled multiplexer and a control circuit for controlling the multiplexer and for generating output control signals. In one embodiment, the control circuit is a finite state machine. Each coupled burst cell is capable of receiving data from an upstream coupled burst cell or from the input bus. The most downstream burst cell always provides the output of the buffer circuit. In this configuration, the buffer of the present invention can be filled starting from its most downstream and vacant burst cell rather than always starting from the most upstream cell (as in a typical FIFO). This advantageously reduces the throughput latency of the buffer in cases when the buffer is not completely full. By using burst cells, rather than a dual ported RAM, the interface circuitry of the present invention is significantly reduced in complexity. Moreover, because each burst cell is uniform in construction and contains distributed interface circuitry, the present invention is readily scaleable by adding or reducing individual burst cells with little or no change in interface circuitry.

Specifically, embodiments of the present invention include a buffer circuit for interfacing between a first digital domain and a second digital domain, the buffer circuit having n circuit stages wherein each circuit stage is coupled to receive an input data bus and wherein a first circuit stage of the n circuit stages is coupled to an output data bus. Each circuit stage of the n circuit stages having a multiplexer coupled to receive the input data bus and also coupled to receive an output data bus from a respective upstream circuit stage and a register circuit coupled to receive an output from the multiplexer and coupled to provide an output data bus to a respective downstream circuit stage and a finite state machine coupled to control the multiplexer and coupled to receive control signals from the respective upstream and downstream circuit stages and coupled to receive read and write common control signals. The n circuit stages are controlled by each finite state machine to provide a load mode wherein data received from the input data bus is stored into the most downstream vacant circuit stage of the n circuit stages and also to provide a shift mode wherein all valid data is shifted downstream by one circuit stage with the first circuit stage supplying data over the output data bus.

BRIEF DESCRIPTION OF THE DRAWINGS

FIG. 7 is a truth table that is implemented by the finite state machine (FSM) of the circuit stages of the intelligent scaleable buffer of the present invention.

FIG. 8 is a logic diagram of a mechanism for generating a buffer almost full signal from the intelligent scaleable buffer of the present invention.

DETAILED DESCRIPTION OF THE INVENTION

In the following detailed description of the present invention, an intelligent and readily scaleable FIFO buffer circuit for interfacing between digital domains, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
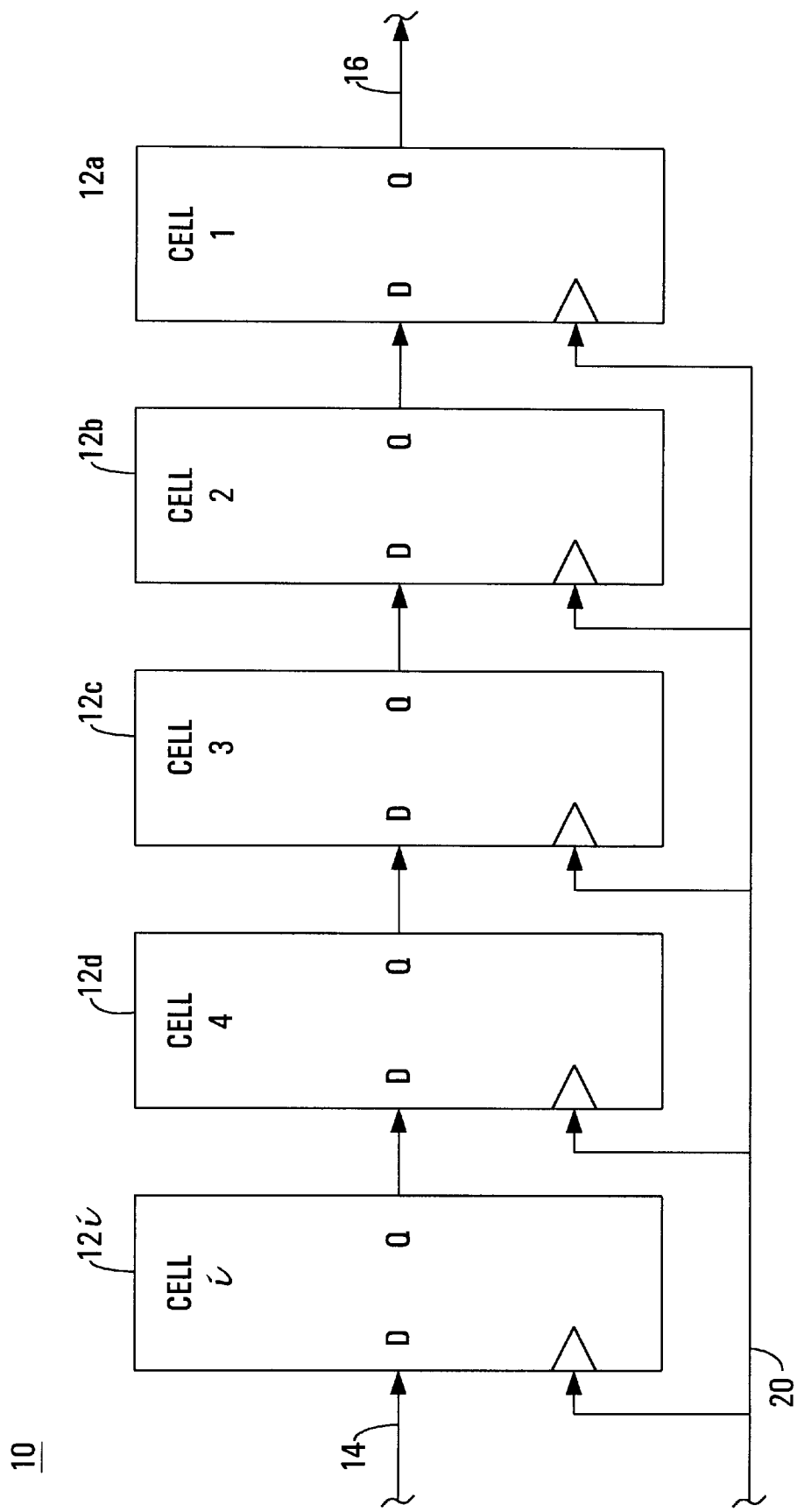
FIG. 1A illustrates a prior art first-in-first-out (FIFO) buffer composed of serial shift registers.
Figure 1B:
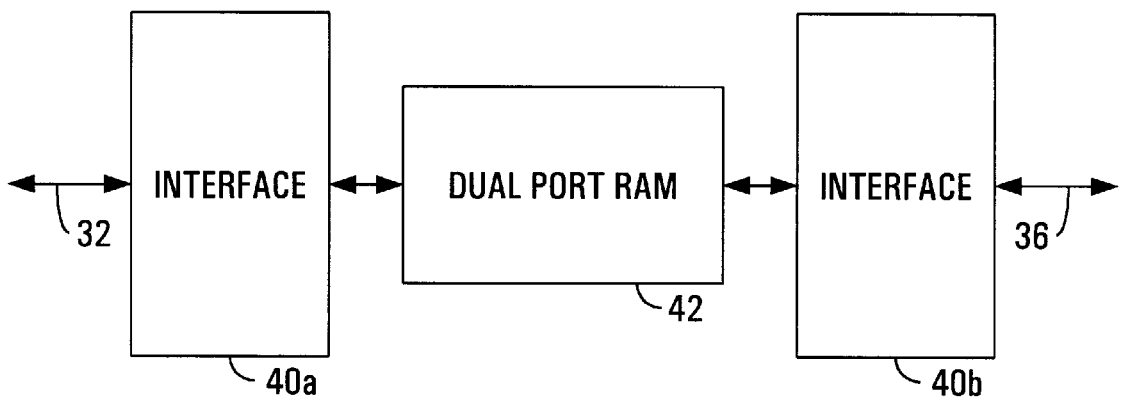
FIG. 1B illustrates a prior art dual ported random access memory (RAM) buffer.
Figure 2:
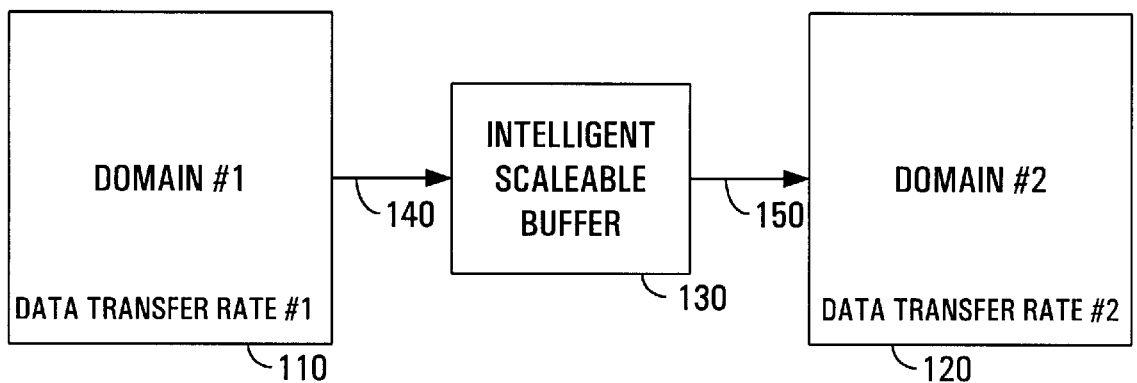
FIG. 2 illustrates a system implemented in accordance with the present invention for transferring information from a first digital domain to a second digital domain using an intelligent scaleable buffer of the present invention.

FIG. 2 illustrates an exemplary communication system 100a in accordance with the present invention. The intelligent scaleable FIFO buffer circuit 130 of the present invention is used as a communication bridge between two digital domains 110 and 120. As discussed more fully below, the intelligent scaleable FIFO buffer circuit ("buffer circuit") 130 of the present invention is characterized in that (1) its minimum latency is not increased in response to a relative increase in its buffer size and (2) it does not require complex interface circuitry and therefore its interface circuitry is readily scaleable in response to an increase in buffer size.

The digital domains 110 and 120 of FIG. 2 can each contain a digital computer system with specific bus protocol or each digital domain can be only a single device. The intelligent scaleable buffer circuit 130 of the present invention is effective for providing a data queue between digital domains that have different data transfer rates and/or different bus protocols. The intelligent scaleable buffer circuit 130 of the present invention is also effective for providing a data queue between digital domains that have compatible clock rates and bus protocols but where one domain performs data bursting to increase communication rate and/or to support prefetching cycles. Synchronization circuitry can also be used with the FIFO of the present invention to work with incompatible clock rates.

System 100a of FIG. 2 illustrates digital domains having different data transfer rates as only one example of the types of digital domains that can be bridged by the buffer 130 present invention. System 100a contains a first digital domain 110 that operates at a first data transfer rate. A second digital domain 120 operates at a second data transfer rate and is bridged to he first domain 110 via buffer 130. Buffer 130 receives data over bus 140 (the input data bus) from the first domain 110 and communicates the data over bus 150 (the output data bus) to the second domain 120. In one implementation of the present invention, one digital domain 110 is compatible with the peripheral component interconnect bus protocol (PCI bus) and the other digital domain is compatible with the ASB bus standard.

In the case where the domains operate at different data transfer rates, the buffer 130 acts as a temporary storage location to latch and hold data until the slower data rate can accept the data without data loss. In the case where the bus protocols are different between the domains, the buffer 130 acts as a temporary storage location hold data until the different protocol can translate and accept the data without data loss. In the case where one domain performs data bursting, the buffer 130 acts as a temporary storage location hold the burst data until the other domain can read the data without data loss.

Figure 3:
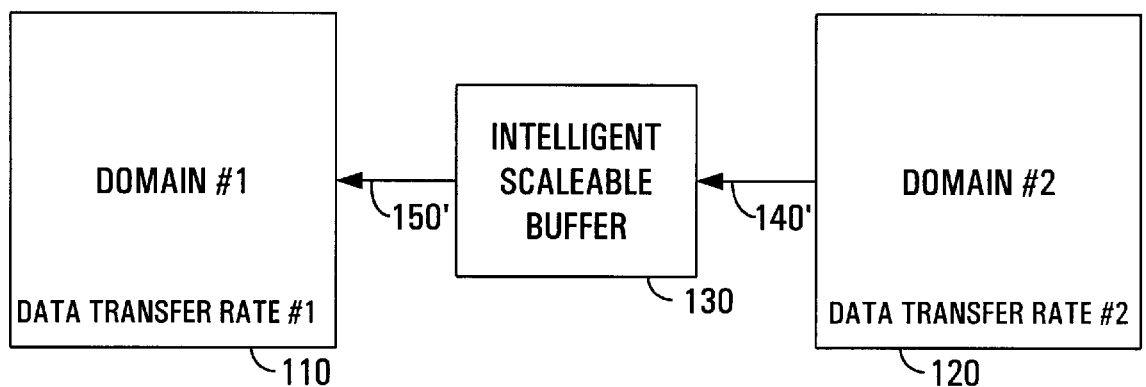
FIG. 3 illustrates a system implemented in accordance with the present invention for transferring information from the second digital domain to the first digital domain using the intelligent scaleable buffer of the present invention.

FIG. 3 illustrates the reverse system 100b where data is transmitted from the second digital domain 120 to the first digital domain 110. Data is transferred to the input data bus 140' which is coupled to the buffer 130 of the present invention. The buffer 130 outputs over an output data bus 150' that is coupled to the first digital domain 110. Generally, two buffer circuits 130 are required for a communication system that needs bidirectional communication between digital domains 110 and 120.

Figure 4A:
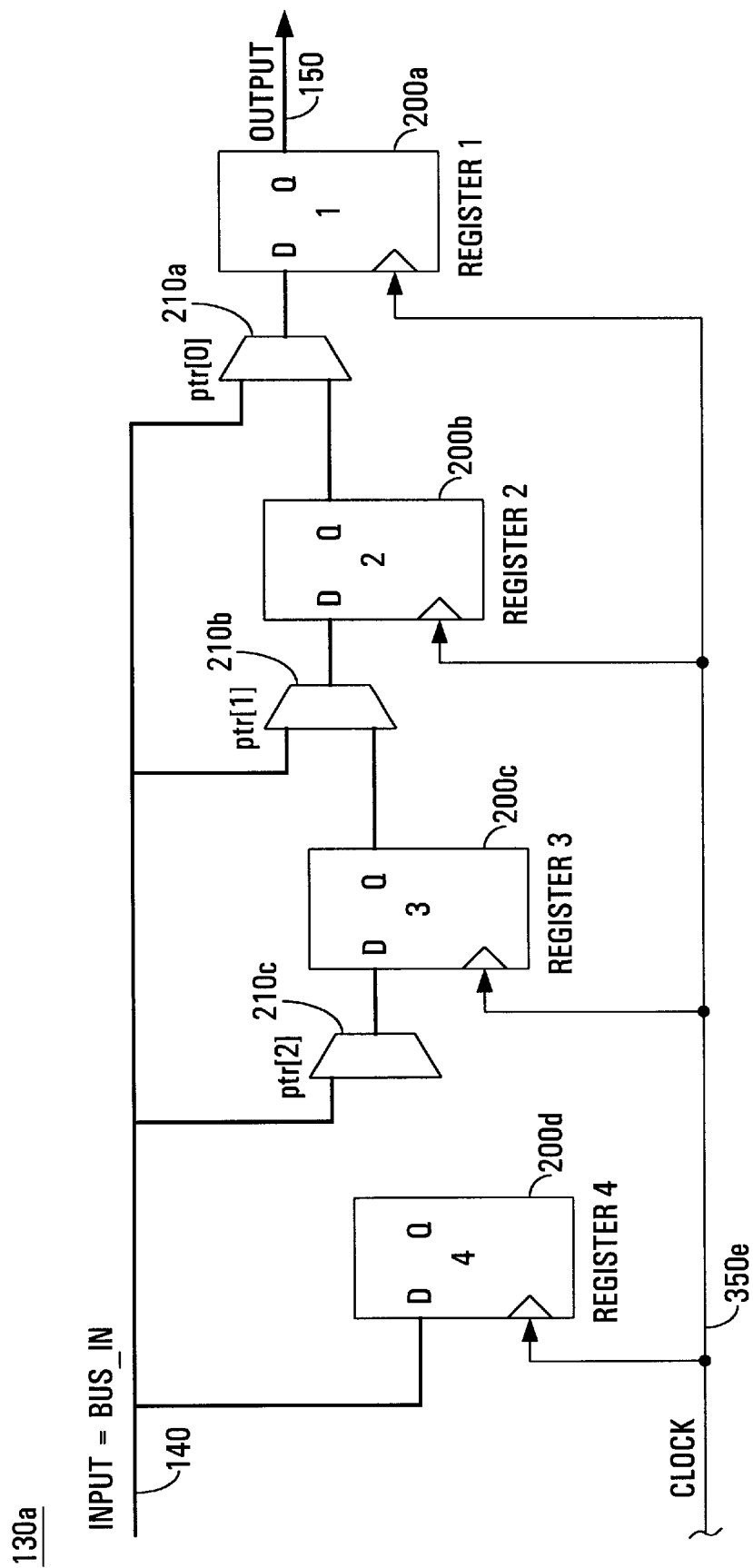
FIG. 4A illustrates one embodiment of the intelligent scaleable FIFO buffer of the present invention.

FIG. 4A illustrates a simplified implementation 130a of the FIFO buffer circuit of the present invention. FIFO buffer circuit ("queue") 130a is an implementation of a memory for queuing data to support processes such as PCI burst cycles between two digital domains. The present invention consists of a series of any number of registers 200a–200d. Registers are numbered starting from the output data bus 150 and counting backward. Therefore registers 200a is the most downstream register and other registers are relative upstream registers to registers 200a. For instance, register3 200c is upstream to register2 200b while registers 200a is downstream to register2 200b. Register4 is the most upstream register of those shown in FIG. 4A. The number of registers 200a–200d used depends on the amount of data that the queue 130a needs to support for any particular application. The width of the registers 200a–200d can be any number of bits.

One embodiment of the present invention is shown in FIG. 4A having four registers 200a–200d with register4 being the most upstream register. Although the registers can be of any width, circuit 130a includes four 32-bit wide registers connected in series to each other and in parallel to the input data bus 140. Each register is clocked by a common clock signal 350e. At the input of each of the registers, the input data comes from a 2-to-1 multiplexer circuit (e.g., 210a–210c) that selects data from either the input data bus 140 or from the immediate upstream register. In this embodiment, the register (e.g., 200b) in combination with the multiplexer (e.g., 210b) is a "circuit stage." Special control signals that are common to all circuit stages and other control signals that originate from the relative upstream and downstream circuit stages are used to generate signals over ptr[0]-ptr[2] to control each multiplexer 210a–210c.

New data is always latched into the most downstream register that is also vacant which is unlike a standard FIFO which always accepts new data in its most upstream register. In the beginning, the queue 130a of FIG. 4A is empty and ready to accept data. When the first data comes over input data bus 140, it is latched at register1 200a because register 200a is the most downstream and vacant circuit stage. If the data has not been read out of the queue 130a and another data comes, this new data is latched at register2 200b which is then the most downstream register that is also vacant. The loading process continues until the most upstream register (e.g., register4 200d) happens also to be the most downstream register that is also vacant. In this case, data is latched into register4 200d and the queue 130a is full and cannot accept any more data until at least one read cycle is performed.

Any one read cycle from the queue 130a of FIG. 4A will act to free up one register. The data is always read from register1 200a and supplied over output data bus 150. During the read cycle, each data of each circuit stage is then shifted downstream one circuit stage with the data in registers 200a being supplied over bus 150, with one upstream circuit stage becoming vacant provided the read was not accompanied by a simultaneous load ("write"). If a read from the queue 130a happens at the same time as the data comes into the queue 130a, then the new data will be latched at the same register as the previous transaction. A "flush" signal is used to discard all the data in the queue 130a and any new data will be latched at registers 200a. This option allows prefetching of data and discarding them when they are not needed. The implementation of the queue 130a in the present invention provides an efficient buffer circuit for storing data.

Figure 4B:
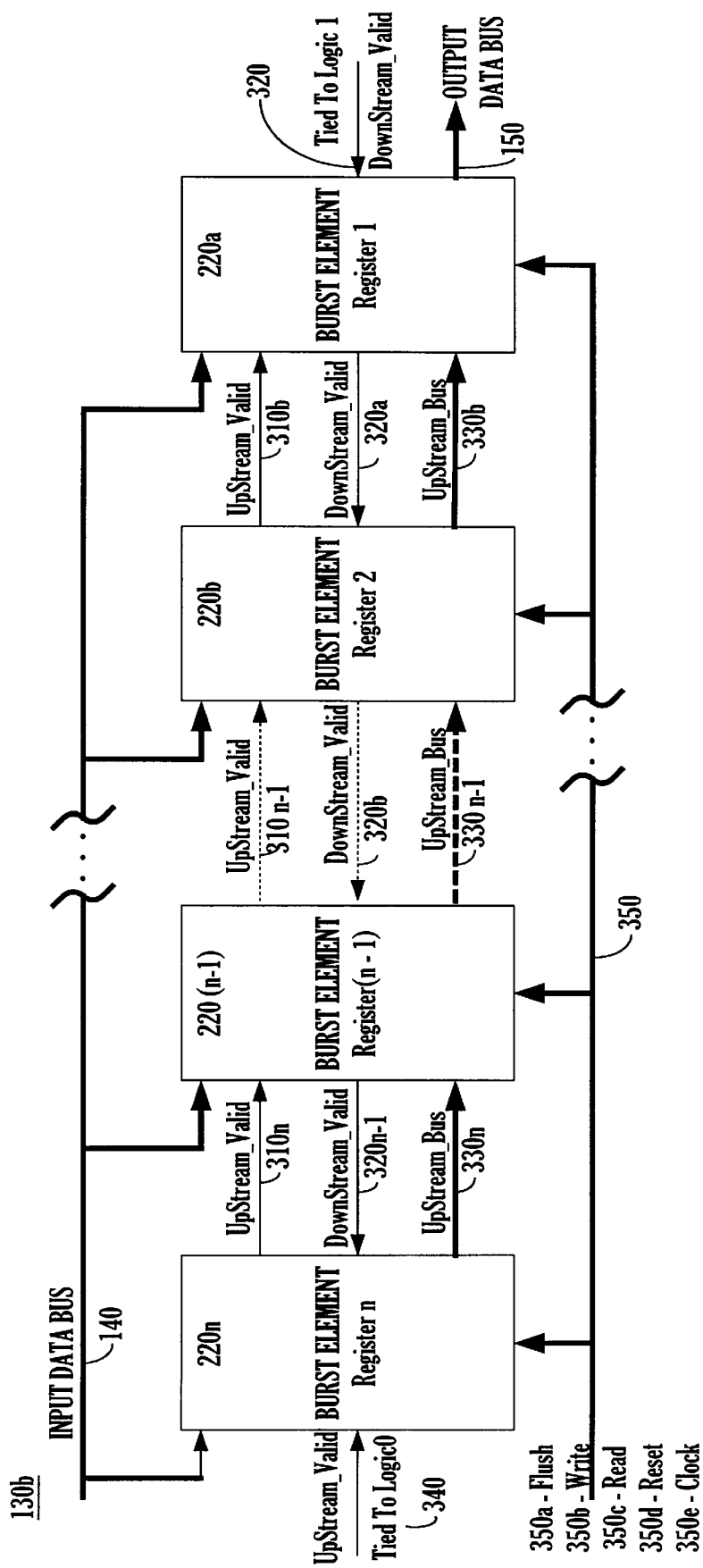
FIG. 4B illustrates a second embodiment of the intelligent scaleable FIFO buffer of the present invention including multiple circuit stages.

FIG. 4B illustrates the preferred embodiment 130b of the FIFO buffer circuit of the present invention. Circuit 130b is completely scaleable having n circuit stages 220a–220n, also called "burst elements." The contents of each circuit stage are described in more detail with respect to FIG. 5. The input data bus 140 of FIG. 4B is coupled to each circuit stage 220a–220n and is therefore common to each circuit stage. The output data bus 150 is taken from the most downstream circuit stage 220a. Bus 350 is also common to each circuit stage being coupled to each of the circuit stages 220a–220n. Common control bus 350 carries common control signals. The flush signal 350a, the write signal 350b, the read signal 350c, the reset signal 350d and the clock signals 350e are common control signals and are all carried within the common control bus 350. The read signal 350c indicates that data is to be read from buffer 130b over output data bus 150. A read typically involves a data shift from the previous circuit stages. The write signal 350b indicates that new data over input data bus 140 is to be loaded into the buffer 130b at some vacant location. Read and write cycles can occur simultaneously. In response to the reset signal 350d, each register of the buffer circuit 130b is cleared.

In addition to illustrating the control signals 350a–350e that are common to all circuit stages 220a–220n, FIG. 4B also illustrates the other control signals that originate from the respective upstream and downstream circuit stages. These signals are the upstream valid control signals 310b–310n and downstream valid control signals 320a–320 (n−1). The upstream data buses 330b–330n are also shown. The upstream valid control signals 310b–310n indicate to respective circuit stages that their immediately positioned upstream circuit stage contains valid data. For instance, the upstream valid signal 310b from circuit stage 220b indicates to circuit stage 220a that circuit stage 220b contains valid data. Typically, when the upstream valid control is set, the data is taken from the upstream bus and not from the input data bus 140. Because circuit stage 220n is the most upstream circuit stage, it has no upstream circuit. Therefore, its upstream valid signal 340 is tied to a logic low.

The downstream valid control signals 320a–320(n−1) of FIG. 4B indicate to respective circuit stages that their immediately positioned downstream circuit stage contains valid data. For instance, the downstream valid signal 320 (n−1) from circuit stage 220(n−1) indicates to circuit stage 220n that circuit stage 220(n−1) contains valid data. Because circuit stage 220a is the most downstream circuit stage, it has no downstream circuit. Therefore, its downstream valid signal 320 is tied to a logic one. The upstream data buses 330b–330n provide data from each circuit stage to its immediately positioned downstream circuit stage. For instance, upstream data bus 330b provides data from circuit stage 220b to circuit stage 220a. The upstream data bus of the most downstream circuit stage 220a is the output data bus 150.

It is appreciated that buffer circuit 130b of the present invention can be increased in size or decreased in size by merely adding or deleting circuit stages and properly setting the logic states of signals 340 and 320 at the buffer ends.

Each circuit stage is of a uniform construction. Each circuit stage, as discussed more fully with respect to FIG. 5, contains its own control circuit for generating its own valid signals and for performing loading, shifting and holding operations. Therefore, the present invention does not require complex redesigning of interface circuits when the size of the buffer needs to be altered either by increasing the buffer size or decreasing the buffer size.

Further, because the buffer circuit 130*b* of the present invention is filled starting from the most downstream vacant register, rather than from the most upstream register (as done in a prior art FIFO), increasing the size of the buffer circuit 130*b* does not necessarily increase the minimum latency through the buffer circuit 130*b* as is true of the prior art FIFO.

In operation generally, a write cycle, by itself, causes new data from input data bus 140 to be loaded into the most downstream and vacant circuit stage of buffer 130*b* with all other valid data being held. A read cycle, by itself, causes the valid data of circuit stage to be shifted downstream by one circuit stage with the data of the circuit stage 220*a* being read out onto the output data bus 150 and the most upstream circuit stage holding valid data becoming vacant (because its data was shifted downstream). It is appreciated that a read cycle accompanied by a write cycle causes (1) the same action as a read cycle by itself (2) with the exception that the most upstream circuit stage holding valid data then becoming vacant and immediately receiving the new data from the input data bus 140.

Figure 5:
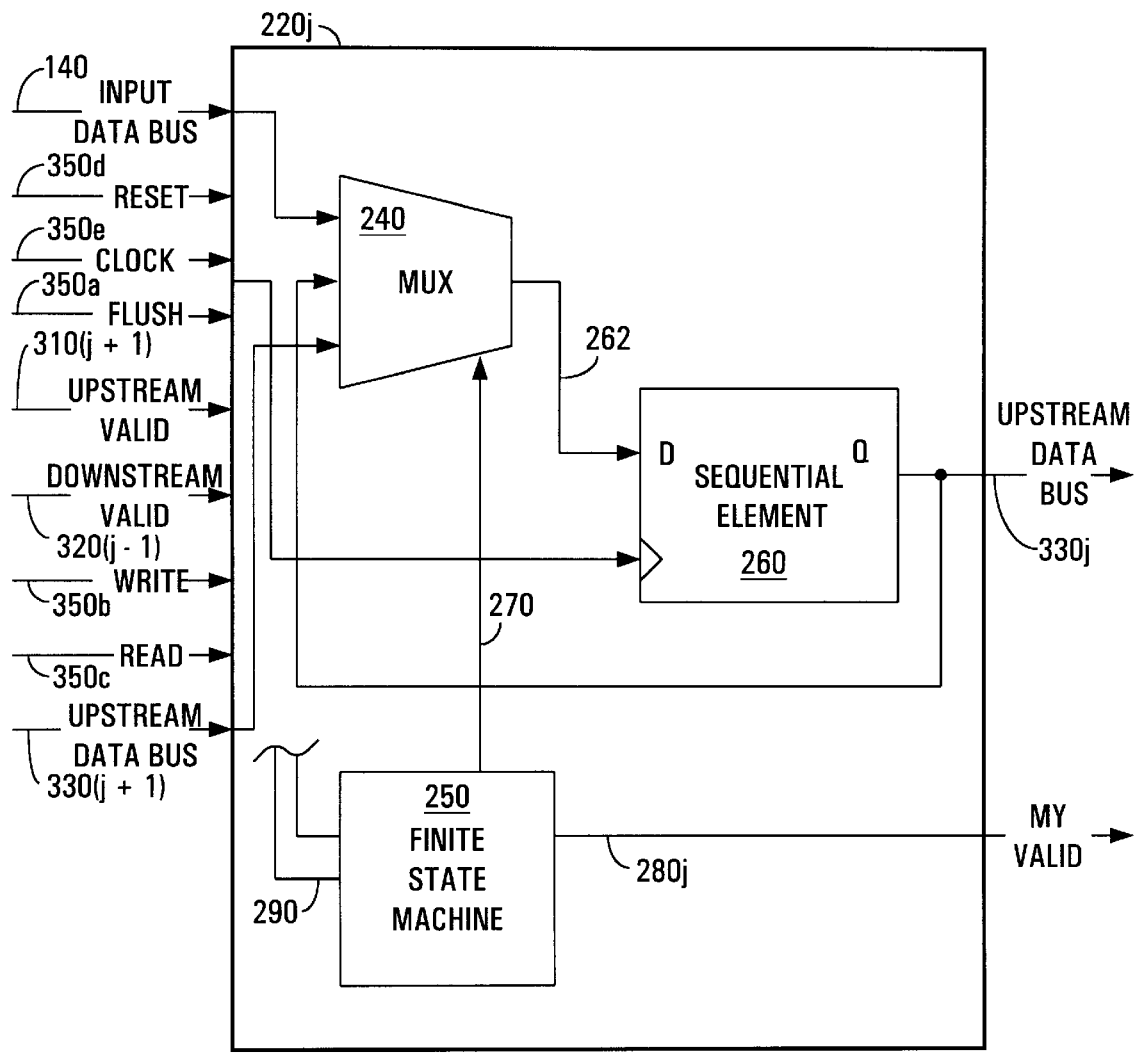
FIG. 5 illustrates a schematic diagram of an exemplary jth circuit stage implemented in accordance with the preferred embodiment of the intelligent scaleable buffer of the present invention.

FIG. 5 illustrates the circuitry of an exemplary circuit stage 220*j* of the buffer circuit 130*b* of FIG. 4B. Each circuit stage 220*j* contains a multiplexer circuit 240 and a sequential element 260 (e.g., a flip-flop or "register"). It is appreciated that each circuit stage of the buffer circuit 130*b* can store a multiple length data piece. For clarity, the circuit of FIG. 5 illustrates certain data paths for only one bit of this data piece. It is appreciated that the single bit multiplexer 240 and single bit register 260 are actually replicated for each bit of the multiple length data piece. Each circuit stage 220*j* also contains a control circuit 250 to control multiplexer circuit 240. In one embodiment of the present invention, the control circuit 250 is a finite state machine (FSM). The control circuit 250 is effective to place the circuit stage 220*j* into one mode of three possible operational modes. The three possible modes being shift mode, load mode and hold mode.

Figure 6:
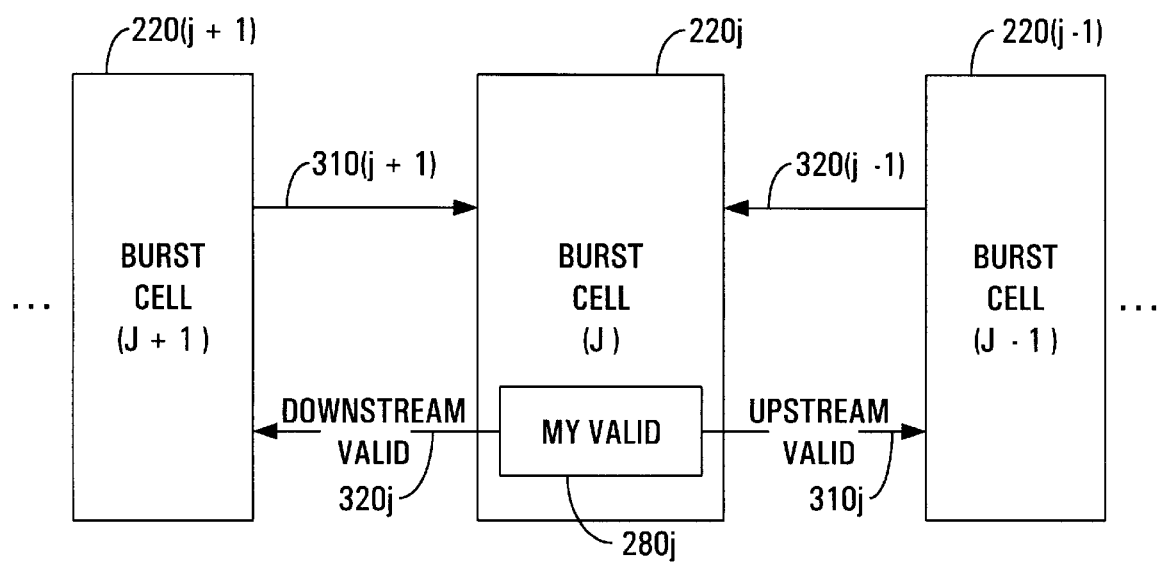
FIG. 6 illustrates the generation of the downstream valid and upstream valid control signals from a jth circuit stage of the intelligent scaleable buffer of the present invention.

The multiplexer 240 is controlled by a control signal over line 270 that originates from the control circuit 250. The multiplexer 240 receives three inputs. The first input is the input data bus 140. The second input is the upstream data bus 330(j+1) that originates from its upstream circuit stage 220(j+1) as shown in FIG. 6. The last input to multiplexer 240 of FIG. 5 is the output of the register 260 of circuit stage 220*j*. The output 262 of the multiplexer is coupled to the D input of the register 260. The register 260 is clocked by common clock signal 350*e*. The Q output of the register 260 is the upstream data bus 330*j* that is coupled to its downstream circuit stage 220(j–1) as shown in FIG. 6. If 220*j* is the most downstream circuit stage, then the output of register 260 is the output data bus 150 (FIG. 4B). The path from the output of register 260 back to the multiplexer 240 of FIG. 5 is used for recirculating data during hold modes.

The control circuit 250 of circuit stage 220*j* is coupled to control multiplexer 240 via line 270 and also generates the signal my valid line 280*j* as shown in FIG. 5. As shown by FIG. 6, my valid 280*j* for circuit stage 220*j* serves (1) as the upstream valid signal 310*j* for downstream circuit stage 220(j–1) and also (2) as the downstream valid signal 320*j* for upstream circuit stage 220(j+1).

The control circuit 250 of FIG. 5 receives many control signals over control bus 290. Control circuit 250 receives the following common control signals over bus 290: the flush signal 350*a*; the write signal 350*b*; the read signal 350*c*; and the reset signal 350*d*. Control circuit 250 also receives the following control signals over bus 290: the upstream valid signal 310(j+1); and the downstream valid signal 320(j–1). The control circuit 250 is also aware of the previous state of the my valid signal 280*j*.

Based on the control signals described, the control circuit 250 for each circuit stage controls its associated multiplexer 240 to implement the shift, hold and load modes. During the hold mode, the value within register 260 is recirculated and output over bus 330*j* and relatched into register 260. Multiplexer 240 is instructed to select its input that originates from the register 260. During the load mode, multiplexer 240 is instructed to select its input that originates from the data input bus 140 and this value is latched into register 260 and presented over bus 330*j*. During the shift mode, multiplexer 240 is instructed to select its input that originates from the upstream data bus 330(j+1) and this value is latched into register 260 and presented over bus 330*j*.

FIG. 7 illustrates a truth table 400 for the control selections performed by the control circuit 250 for one embodiment of the present invention. Given the truth table 400 of FIG. 7, the finite state machine implementation of control circuit 250 can readily be performed. The syntax "x" within table 400 represents a "don't care" state of the corresponding signal. The "my valid" column within group 440 represents the state of the my valid signal 280*j* in the current clock state while the "my valid" column within group 445 represents the state of the my valid signal 280*j* in the next clock state. Signal group 440 represents the inputs to the finite state machine 250 while signal group 445 represents the output signals of the finite state machine 250. Entry 412 represents the case when the flush signal 350*a* is asserted. In response to this condition, the my valid signals of all circuit stages are reset to zero. The buffer circuit 130*b* is said to be empty at this time. Entry 414 represents the case where both the upstream valid 310(j+1) and the downstream valid 320(j–1) control signals are zero. In response to this condition, the my valid signal 280*j* is reset by FSM 250.

Entries 416 to 422 of FIG. 7 represent cases in which the downstream valid signal 320(j–1) is asserted but the my valid state is zero, so the circuit stage 220*j* does not contain valid data. At entry 416, the downstream valid signal 320 (j–1) is asserted but no reading and no writing is being done and no data is held in the circuit stage 220*j*, so the multiplexer 240 is placed into the hold mode by the FSM 250 and my valid 280*j* is reset. At entry 418, the downstream valid signal 320(j–1) is asserted and a read is taking place but no data is held in the circuit stage 220*j*, so my valid 280*j* is reset. At entry 420, the downstream valid signal 320(j–1) is asserted and the upstream valid signal 310(j+1) is not asserted and a write ("load") is taking place but no data is held in the circuit stage 220*j*. In this case, the circuit stage 220*j* is the most downstream vacant circuit stage and a load mode takes place into circuit stage 220*j* thereby forcing my valid 280*j* high. At entry 422, the downstream valid signal 320(j–1) is asserted and a read and write take place but no data is held in the current stage 220*j*. The data is passed through.

Entries 424 to 430 of FIG. 7 represent cases in which the downstream valid signal 320(j–1) is asserted and the my valid state is asserted, so the circuit stage 220*j* contains valid data. At entry 424, the downstream valid signal 320(j−1) is asserted and the my valid signal 280*j* is asserted but no reading and no writing is being done, so the multiplexer 240 is placed into the hold mode by the FSM 250 and my valid 280*j* is set. At entry 426, the downstream valid signal 320(j−1) is asserted and the my valid signal 280*j* is asserted and a read takes place but the upstream valid 310(j+1) is not valid. The circuit stage 220*j* is therefore the downstream most stage (e.g., circuit stage 220*a*) and its value is read and then cleared. At entry 428, the downstream valid signal 320(j−1) is asserted and the my valid signal 280*j* is asserted and a write takes place but the upstream valid 310(j+1) is not valid. In this case, upstream loading is taking place and the multiplexer 240 is placed into the hold state and my valid 280*j* is set. At entry 430, the downstream valid signal 320(j−1) is asserted and the my valid signal 280*j* is asserted and a write and a read take place but the upstream valid 310(j+1) is not valid. In this case, the multiplexer 240 is placed into the load mode and my valid 280*j* is set.

Entries 432 to 438 of FIG. 7 represent cases in which the downstream valid signal 320(j−1) is asserted and the my valid state is asserted and the upstream valid 310(j+1) signal is asserted, so the circuit stage 220*j* contains valid data and is located in the middle of the valid data chain. At entry 432, the downstream valid signal 320(j−1) is asserted and the my valid signal 280*j* is asserted and the upstream valid 310(j+1) signal is asserted but no reading and no writing is being done, so the multiplexer 240 is placed into the hold mode by the FSM 250 and my valid 280*j* is set. At entry 434, the downstream valid signal 320(j−1) is asserted and the my valid signal 280*j* is asserted and the upstream valid 310(j+1) is asserted and a read takes place. In this case, the data is read from downstream and a shift mode occurs, because upstream valid 310(j+1) is set, with my valid 280*j* being set. At entry 436, the downstream valid signal 320(j−1) is asserted and the my valid signal 280*j* is asserted and a write takes place with the upstream valid 310(j+1) set. In this case, the multiplexer 240 is placed into the hold mode and my valid 280*j* is set. At entry 438, the downstream valid signal 320(j−1) is asserted and the my valid signal 280*j* is asserted and a write and a read take place with the upstream valid 310(j+1) set. In this case, the multiplexer 240 is placed into the shift mode and my valid 280*j* is set.

It is appreciated that because the control circuit 250 is positioned within each of the circuit stages 220*j* and operates based on common control signals from bus 350 and based on signals from neighboring circuit stages, the size of the buffer circuit 130*b* can be readily expanded or decreased by merely adding or removing the appropriate amount of circuit stages and connecting each stage to its adjacent neighbors and to bus 350. Scaleability is further enhanced because each circuit stage is uniform in its construction. This significantly reduces the design time required to increase or decrease the buffer size, as required, within a particular integrated circuit application.

FIG. 8 illustrates that the my valid signal 280(N−Z) of the circuit stage 220(N−Z), which is located roughly at a position (e.g., N−Z) inside of an n-deep buffer 130*b*, can be used as an almost-full indicator for buffer circuit 130*b*. The position, N−Z, is the Zth element from the top. In this case, the almost-full buffer indicator is broken out as signal 510. Almost-full buffer indicators are important in certain throughput monitoring applications because they typically signal a data halt condition. In the time that the data halt signal 510 is generated to the time the data halt signal 510 is acknowledged by the data provider, the buffer circuit typically becomes full. In this case, the data halt signal 510 is fed back to one of the digital domains (e.g., 110 or 120 of FIG. 2). Since valid signals are readily available on each stage, automatic fine tuning of the Z value can be made dynamic in accordance with the present invention.

The preferred embodiment of the present invention, an intelligent and readily scaleable FIFO buffer circuit for interfacing between digital domains, is described. While the present invention has been described in particular embodiments, it should be appreciated that the present invention should not be construed as limited by such embodiments, but rather construed according to the below claims.

What is claimed is:

1. A buffer circuit comprising:

n circuit stages wherein each circuit stage is coupled to receive an input data bus and wherein a first circuit stage of said n circuit stages is coupled to an output data bus, each circuit stage of said n circuit stages comprising:

a multiplexer coupled to receive said input data bus and also coupled to receive an output data bus from a respective upstream circuit stage;

a register circuit coupled to receive an output from said multiplexer and coupled to provide an output data bus to a respective downstream circuit stage; and a control circuit coupled to control said multiplexer and coupled to receive control signals from said respective upstream and downstream circuit stages and coupled to receive common control signals, wherein said n circuit stages are controlled by each control circuit to provide a load mode wherein data received from said input data bus is stored into the most downstream vacant circuit stage of said n circuit stages and also to provide a shift mode wherein all valid data is shifted downstream by one circuit stage with said first circuit stage supplying data over said output data bus.

2. A buffer circuit as described in claim 1 wherein said control circuit for each circuit stage is a finite state machine.

3. A buffer circuit as described in claim 1 wherein said control circuit generates a data valid signal used as a downstream valid signal for said respective upstream circuit stage and used as an upstream valid signal for said respective downstream circuit stage.

4. A buffer circuit as described in claim 3 wherein said control circuit of each circuit stage is coupled to receive a flush common control signal and wherein said data valid signal of each circuit stage indicates invalid data in response to assertion of said flush common control signal.

5. A buffer circuit as described in claim 1 wherein said control circuit of each circuit stage is coupled to receive a read common control signal and a write common control signal.

6. A buffer circuit as described in claim 1 wherein said register circuit of each circuit stage is a D flip-flop circuit.

7. A buffer circuit as described in claim 1 wherein said multiplexer of each circuit stage is also coupled to receive said output data bus of said register circuit and wherein said n circuit stages are controlled by each control circuit to provide a hold mode wherein valid data of each circuit stage is recirculated within each circuit stage.

8. A FIFO buffer circuit for interfacing between a first digital domain and a second digital domain, said buffer circuit comprising:

n circuit stages wherein each circuit stage is coupled to receive an input data bus and wherein a first circuit stage of said n circuit stages is coupled to an output data bus, each circuit stage of said n circuit stages comprising:
- a multiplexer coupled to receive said input data bus and also coupled to receive an output data bus from a respective upstream circuit stage;
- a register circuit coupled to receive an output from said multiplexer and coupled to provide an output data bus to a respective downstream circuit stage; and
- a finite state machine coupled to control said multiplexer and coupled to receive control signals from said respective upstream and downstream circuit stages and coupled to receive read and write common control signals, wherein said n circuit stages are controlled by each finite state machine to provide a load mode wherein data received from said input data bus is stored into the most downstream vacant circuit stage of said n circuit stages and also to provide a shift mode wherein all valid data is shifted downstream by one circuit stage with said first circuit stage supplying data over said output data bus.

9. A FIFO buffer circuit as described in claim 8 wherein said finite state machine generates a data valid signal used as a downstream valid signal for said respective upstream circuit stage and used as an upstream valid signal for said respective downstream circuit stage.

10. A FIFO buffer circuit as described in claim 9 wherein said finite state machine of each circuit stage is coupled to receive a flush common control signal and wherein said data valid signal of each circuit stage indicates invalid data in response to assertion of said flush common control signal.

11. A FIFO buffer circuit as described in claim 8 wherein said read common control signal places said n circuit stages into said shift mode and wherein said write common control signal places said n circuit stages into said load mode.

12. A FIFO buffer circuit as described in claim 8 wherein said register circuit of each circuit stage is a D flip-flop circuit.

13. A FIFO buffer circuit as described in claim 8 wherein said multiplexer of each circuit stage is also coupled to receive said output data bus of said register circuit and wherein said n circuit stages are controlled by each finite state machine to provide a hold mode wherein valid data of each circuit stage is recirculated within each circuit stage.

14. A communication system comprising:
- a first digital domain coupled to an input bus;
- a second digital domain coupled to an output bus; and
- a FIFO buffer circuit coupled between said first and second digital domains and comprising n circuit stages wherein each circuit stage is coupled to receive said input data bus and wherein a first circuit stage of said n circuit stages is coupled to said output data bus, each circuit stage of said n circuit stages comprising:
  - a multiplexer coupled to receive said input data bus and also coupled to receive an output data bus from a respective upstream circuit stage;
  - a register circuit coupled to receive an output from said multiplexer and coupled to provide an output data bus to a respective downstream circuit stage; and
  - a control circuit coupled to control said multiplexer and coupled to receive control signals from said respective upstream and downstream circuit stages and coupled to receive common control signals, wherein said n circuit stages are controlled by each control circuit to provide a load mode wherein data received from said input data bus is stored into the most downstream vacant circuit stage of said n circuit stages and also to provide a shift mode wherein all valid data is shifted downstream by one circuit stage with said first circuit stage supplying data over said output data bus.

15. A communication system as described in claim 14 wherein said control circuit for each circuit stage is a finite state machine.

16. A communication system as described in claim 14 wherein said control circuit generates a data valid signal used as a downstream valid signal for said respective upstream circuit stage and used as an upstream valid signal for said respective downstream circuit stage.

17. A communication system as described in claim 16 wherein said control circuit of each circuit stage is coupled to receive a flush common control signal and wherein said data valid signal of each circuit stage indicates invalid data in response to assertion of said flush common control signal.

18. A communication system as described in claim 14 wherein said control circuit of each circuit stage is coupled to receive a read common control signal and a write common control signal.

19. A communication system as described in claim 14 wherein said register circuit of each circuit stage is a D flip-flop circuit.

20. A communication system as described in claim 14 wherein said multiplexer of each circuit stage is also coupled to receive said output data bus of said register circuit and wherein said n circuit stages are controlled by each control circuit to provide a hold mode wherein valid data of each circuit stage is recirculated within each circuit stage.

21. A communication system as described in claim 14 wherein said FIFO buffer circuit has a tunable almost-full signal to optimize data transfer.

* * * * *